(No Model.)
C. W. BOYNTON.
SAW HANDLE.
No. 356,820.          Patented Feb. 1, 1887.
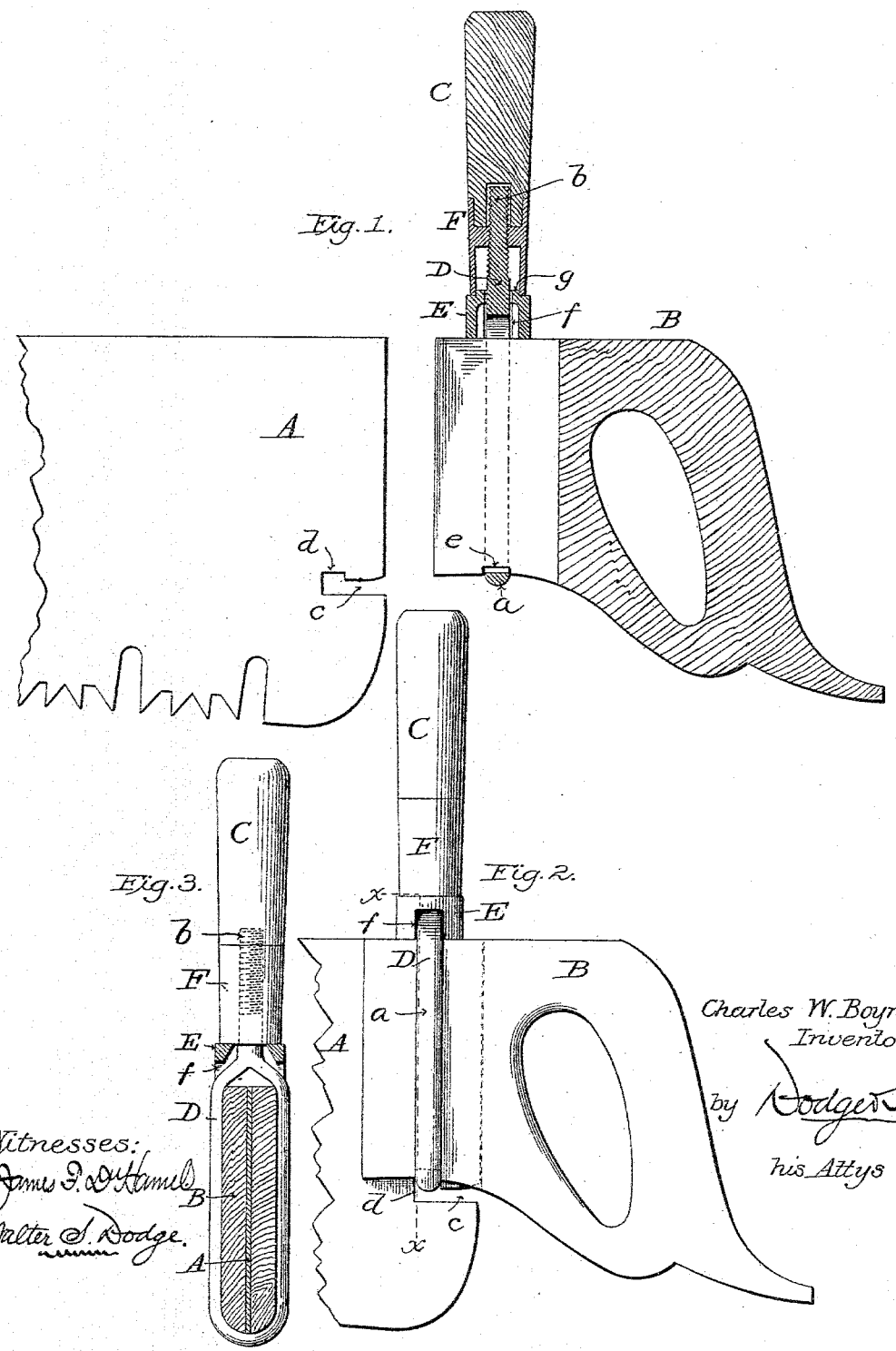

UNITED STATES PATENT OFFICE.

CHARLES WILSON BOYNTON, OF BROOKLYN, NEW YORK.

SAW-HANDLE.

SPECIFICATION forming part of Letters Patent No. 356,820, dated February 1, 1887.

Application filed August 16, 1886. Serial No. 211,008. (No model.)

*To all whom it may concern:*

Be it known that I, CHARLES WILSON BOYNTON, of Brooklyn, in the county of Kings and State of New York, have invented certain new and useful Improvements in Saw-Handles, of which the following is a specification.

My invention relates to handles for crosscut-saws; and it consists in a novel clamping device by which both the ordinary end handle of a hand-saw and an upright handle are secured to the blade without the employment of any rivet, bolt, or screw passing through the blade.

In the accompanying drawings, Figure 1 is a side elevation of part of a saw-blade and the improved handle and attaching devices, the latter being shown in section; Fig. 2, a side view of the parts in position; Fig. 3, a transverse section on the line x x of Fig. 2.

A indicates the saw-blade, B the ordinary end handle, and C the upright handle used in connection therewith, said parts being of the usual outward form.

D indicates a bolt formed with an elongated eye or loop, a, of such size as to pass over and fit snugly upon the inner end of handle B, as best illustrated in Fig. 3, the shank or stem b of said bolt being threaded, as shown.

By reference to Fig. 1 it will be seen that the blade A is formed with an opening, c, having a notch or offset, d, to receive the lower end or cross-bar of loop a of the bolt D, and that the handle B is also formed with a notch, e, in its under side or edge for the same purpose.

E indicates a collar which encircles bolt D, and is formed with side openings, f, for the side bars of the loop a to pass through, the collar fitting over the loop, as shown in Figs. 2 and 3, and being thereby prevented from turning.

The upright handle C is furnished with a combined ferrule and nut, F, the lower end of which is of annular form, and encircles a neck or boss, g, formed upon the collar E, thus centering the several parts and retaining them in proper relative position. The ferrule is made fast upon the handle C, so that it shall turn therewith, and the handle is centrally bored to afford space for the stem or shank of the bolt to pass above the nut, as shown in Fig. 1.

The parts being thus constructed, the stem b of bolt D is passed through collar E, the upright handle with its combined furrule and nut screwed a short distance upon said stem, and the bolt D is passed over or around the inner end of the end handle, B, to the position indicated in Fig. 1, the collar E resting upon the upper edge or face of handle B, as shown. The blade A is then inserted into the slit in said handle B, the opening c permitting the blade to pass into the handle until the notch d of the blade comes into line with the notch e of handle B, the end of the blade then preferably abutting against the end wall of the slit, as indicated in dotted lines in Fig. 2. When the blade reaches this position, the upright handle C, with its combined nut and ferrule, is turned to draw the threaded end upward into the notches d e. In so doing the collar E will be pressed down upon the handle B, and the upper edge of the saw-blade will be forced firmly against the lower face of the collar; hence both the blade and handle B will be held firmly between the lower end of the loop and the bottom of the collar, and thus both handles will be rigidly secured in place by the tightening of the upright handle C.

By this construction and arrangement I am enabled to secure both handles quickly and firmly in place.

The attachment as a whole is cheap and simple, yet strong and durable.

The notch d may be at the extreme lower edge of the saw, the recess c being in such case omitted.

I am aware that it is not new to provide a saw with two handles, one slotted to fit the end of the blade and the other resting upon the top of the latter and provided with a bolt to retain both handles in place, such a device being illustrated in the patent to E. M. Boynton, No. 175,268. Neither do I wish to be understood as claiming, broadly, a loop adapted to pass about the saw-blade, and thereby secure two handles in place. While thus acknowledging fully the prior state of the art, I would state that I believe that my construction possesses material and substantial advantages over prior constructions, not only on account of the reduced cost, but because of the increased strength and durability.

It will be noticed that by having the loop a pass about the sides of the slotted end of the handle B any tendency there might be of the latter splitting lengthwise along the slot is obviated, and it will also be seen that by providing the handle with a notch or recess, e, to coincide with a notch, d, in the saw-blade, and to receive the loop, the use of special rivets to prevent movement of the handle B is unnecessary.

I do not broadly claim the eyebolt, upright handle, nut, and collar; but,

Having thus described my invention, what I claim is—

1. In combination with a saw-blade having a notch, d, the handle B, provided with a slit to receive the saw-blade, bolt D, having loop a to pass about the handle B and the blade, collar E, encircling said bolt and resting upon said handle B, and upright handle C, provided with nut F, screwed upon bolt D, all substantially as described and shown.

2. In combination with blade A and handle B, clasping the same, the bolt D, provided with loop a, to pass about the handle B, collar E, having side openings, f, and neck g, and resting upon the saw, and handle C, provided with combined ferrule and nut F, adapted to encircle the neck g and receive bolt D, all substantially as shown and described.

3. In combination with a saw-blade, A, having a notch, d, a saw-handle, B, slotted to clasp the saw-blade and provided with a notch, e, coincident with the notch d, a bolt, D, having a loop, a, to encircle the handle B and blade A and to enter the notches d e, and an upright handle, C, provided with a nut to receive the bolt D, substantially as shown.

CHARLES WILSON BOYNTON.

Witnesses:
M. L. DE COURSEY,
JOHN POTTER.